United States Patent [19]
Sidey

[11] Patent Number: 5,922,051
[45] Date of Patent: Jul. 13, 1999

[54] SYSTEM AND METHOD FOR TRAFFIC MANAGEMENT IN A NETWORK MANAGEMENT SYSTEM

[75] Inventor: Michael J. Sidey, Middletown, N.J.

[73] Assignee: NCR Corporation, Dayton, Ohio

[21] Appl. No.: 08/855,691

[22] Filed: May 14, 1997

[51] Int. Cl.[6] .................................................. G06F 17/00
[52] U.S. Cl. ......................................................... 709/223
[58] Field of Search ........................ 395/200.32, 200.33, 395/200.53, 200.54

[56] References Cited

U.S. PATENT DOCUMENTS 5,197,127 3/1993 Waclawsky et al. .................... 395/200
5,504,921 4/1996 Dev et al. ................................ 395/800
5,508,941 4/1996 Leplingard et al. ..................... 364/514
5,555,191 9/1996 Hripcsak ................................. 364/514
5,636,344 6/1997 Lewis .................................. 395/200.11

Primary Examiner—Ellis B. Ramirez
Attorney, Agent, or Firm—William A. Munck; John T. Mockler

[57] ABSTRACT

For use in a computer network having a plurality of nodes associated therewith, a data traffic management system for managing data traffic among the plurality of nodes, comprising 1) a polling circuit that retrieves node traffic information from the plurality of nodes; and 2) process logic that compares first selected node traffic information associated with a first selected one of the plurality of nodes with a first threshold level to detect a trend in the first selected node traffic information with respect to the first threshold level.

31 Claims, 3 Drawing Sheets

SYSTEM AND METHOD FOR TRAFFIC MANAGEMENT IN A NETWORK MANAGEMENT SYSTEM

TECHNICAL FIELD OF THE INVENTION

The present invention is directed, in general, to a computer system and, more specifically, to a system and method for monitoring and directing data traffic in a computer network.

BACKGROUND OF THE INVENTION

A network management system typically comprises at least one network management station which manages one or more network nodes (called "managed nodes"). The management information is exchanged between the management station and the managed nodes. A unit of network management information is referred to as a "managed object." Managed objects that are related are defined in the Management Information Base (MIB). The MIB can be located in a managed node and accessed via a network management protocol, such as SNMP. The management station executes a network management program and each of the managed nodes contains an agent capable of exchanging network management information with the management station.

In a network management system, each managed node is viewed as having a plurality of "variables." By reading (polling) the managed modes to obtain the values of these variables, the management station can monitor the managed nodes. By remotely changing (writing) the values of these variables, a management station can control the managed nodes.

Many common types of network management programs (NMPs) and network management systems (NMSs) do not fully utilize the information available in the managed objects that are gathered from the network nodes. Prior art network management systems and network management programs generally make simple inferences about the network interconnectivity, but not about the need for specific data traffic capacity throughout the network or in a particular node in the network.

Existing network management systems read only a limited subset of MIB information. These systems may be directed to collect specific MIB objects in addition to the MIB objects routinely collected by these systems in order to generate graphical or tabular outputs representing the layout of the network.

The prior art network management systems are capable only of basic analysis and simple remedial action with respect to data traffic in a computer network. For example, network management systems can periodically collect "bad packet" frequency data from a particular port in a network node and compare the rate at which bad packets are received with selected alarm levels, such as a rising threshold alarm level of 10% and a falling threshold alarm level of 5%. An alarm condition is initiated when the error rate increases above the rising threshold alarm level and is terminated when the error rate decreases below the falling threshold alarm level.

However, there are no means for observing a trend in MIB object statistical data, such as bad packet frequency data, that may allow a system operator to take preemptive corrective action or allow the network management system to take preemptive corrective action automatically. Additionally, there are no means for ignoring occasional periods during which a high rate of bad packets are received, rather than generating an alarm. Nor are there means for comparing such occasional periods of high error rate on a particular node with similar periods on similar ports in the same network in order to determine the degree to which these periods are unusual.

Therefore, there is a need in the art for intelligent systems and methods that monitor data traffic in a computer network and detect trends with respect to selected data traffic statistical information. There is also a need in the art for intelligent systems and methods that alert a system operator to a potential problem condition. There is a still further need in the art for intelligent systems that automatically initiate preemptive corrective action in response to a detected trend in the selected data traffic statistical information.

SUMMARY OF THE INVENTION

To address the above-discussed deficiencies of the prior art, the present invention provides, for use in a computer network having a plurality of nodes associated therewith, a data traffic management system for managing data traffic among the plurality of nodes, comprising 1) a polling circuit that retrieves node traffic information from the plurality of nodes; and 2) process logic that compares first selected node traffic information associated with a first selected one of the plurality of nodes with a first threshold level to detect a trend in the first selected node traffic information with respect to the first threshold level.

In an alternate embodiment of the present invention, the process logic, in response to a detection of the trend, modifies a polling rate at which a polling circuit retrieves the first selected node traffic information.

In another embodiment of the present invention, the process logic increases the polling rate in response to a trend indicating that an error rate of the data traffic is increasing toward the first threshold level.

In still another embodiment of the present invention, the process logic, in response to a determination that the first selected node traffic information has exceeded the first threshold level for only an insignificant period of time, suppresses an alarm indicating that node traffic information has exceeded the first threshold level.

In a preferred embodiment of the present invention, the process logic compares second selected node traffic information associated with a second selected one of the plurality of nodes with a second threshold level to detect a trend in the second selected node traffic information with respect to the second threshold level.

In another embodiment of the present invention, the process logic triggers an urgent alarm in response to a determination that first selected node traffic information and the second selected node traffic information are simultaneously exceeding the first and second threshold levels, respectively.

In another embodiment of the present invention, the process logic alerts a system operator to maintenance activities in the computer network that coincide with faults detected by the process logic.

In another embodiment of the present invention, the process logic alerts a system operator to external disturbances, such as those of an electrical, radio or optical nature, occurring at one of the plurality of nodes that coincide with faults detected by the process logic.

In another embodiment of the present invention, the process logic generates data traffic to test a data traffic capacity of a selected one of the plurality of nodes.

In still another embodiment of the present invention, the process logic associates an eventual outcome associated with the trend, wherein the eventual outcome causes the process logic to alert a system operator to take corrective action.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
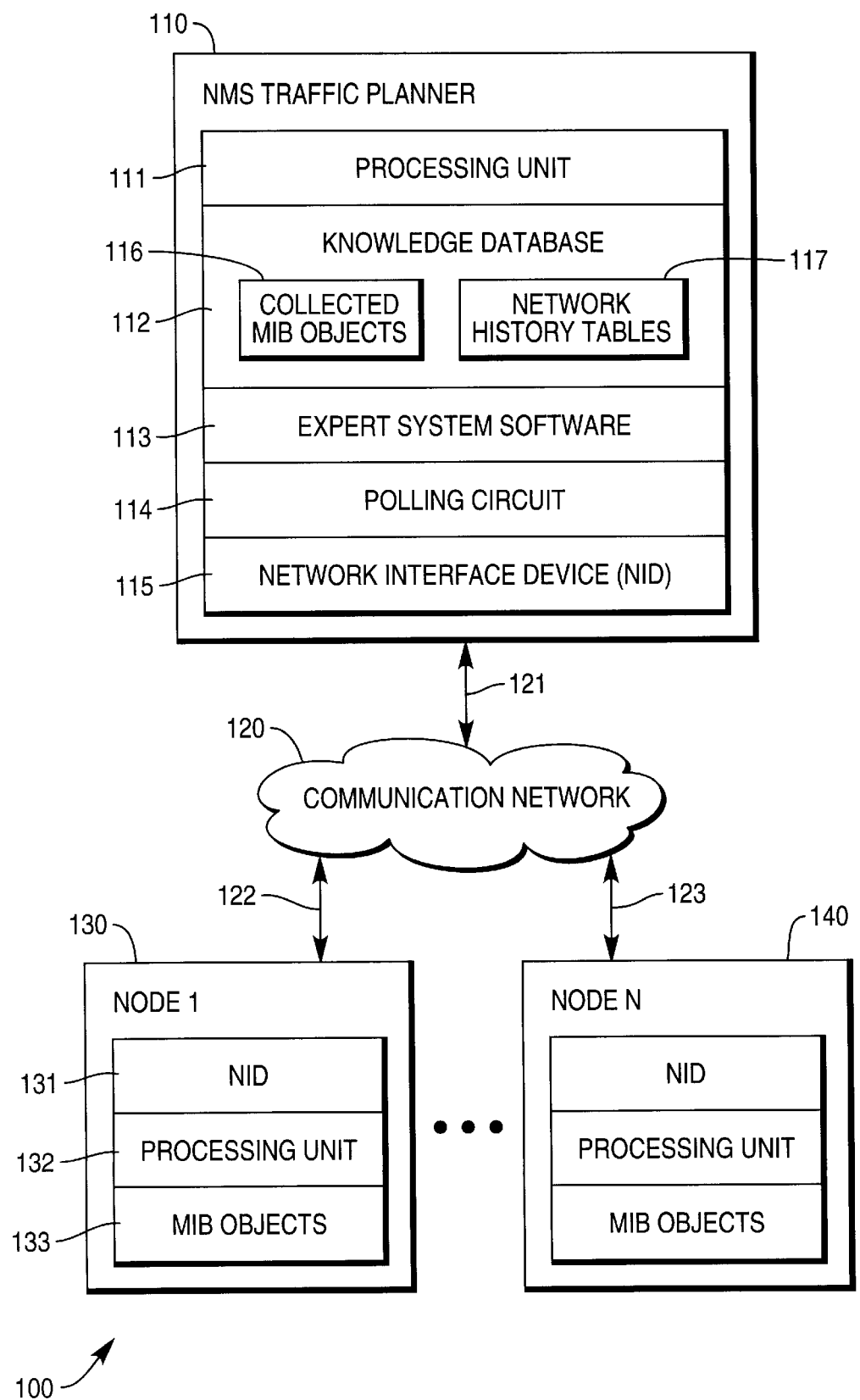
FIG. 1 is a block diagram of a communication network according to one embodiment of the present invention.

FIG. 1 is a block diagram of computer network 100 according to one embodiment of the present invention. Computer network 100 comprises network management system (NMS) traffic planner 110, communication network 120 and network nodes 130 and 140, which are exemplary ones of a plurality of nodes 1-N. NMS traffic planner 110 is coupled to communication network 120 by data link 121, and network nodes 130 and 140 are coupled to communication network 120 by data links 122 and 123, respectively. Communication network 120, which may be, for example, an Ethernet, provides data communications among NMS traffic planner 110 and network nodes 130 and 140.

Each of the network nodes performs one or more desired tasks. For example, a network node that is a user terminal can run an operating system and user applications in a windowing environment. A network node that is a router can receive data packets from a first network node and relay them to a second network node according to network addresses associated with the data packets. Each node may have one or more network interface devices connected via associated data links to the communication network. The communication network may comprise one or more paths, either shared or unshared.

Node 130 is a representative one of network nodes 1-N in computer network 100. Node 130 comprises network interface device 131, processing unit 132, which includes the system hardware and system software for operating node 130, and management information base (MIB) objects 133. MIB objects 133 comprise a set of informational elements that contain identification data and statistical data relating to such elementary events as the quantity of "bad packets" received on a particular network port. MIB objects 133 are retrieved and used by NMS traffic planner 110 to control data traffic flow in computer network 100.

NMS traffic planner 110 comprises processing unit 111, which includes system hardware and system software for operating NMS traffic planner 110, knowledge database 112, polling circuit 114, network interface device (NID) 115, and the necessary process logic for intelligently analyzing data traffic in order to detect traffic trends and issue alarms. Knowledge database 112 further includes collected management information base (MIB) objects 116, which contains MIB objects collected from network nodes 1-N, and network history tables 117.

In the described embodiment, the necessary process logic is implemented in expert system software 113. However, an expert system is selected for the purposes of illustration only and those skilled in the art will recognize that the process logic may be implemented in a variety of ways. Broadly speaking, the process logic may be implemented in hardware, firmware, software, or any combination of two or more of these.

Processing unit 111 controls the overall operation of NMS traffic planner 110. Expert system software 113 performs functions required by NMS traffic planner 110, such as polling network nodes through polling circuit 114 in order to retrieve the MIB objects in the network nodes, and assessing and compiling data in order to manage data traffic in computer network 100.

NID 131 in network node 130 and NID 115 in NMS traffic planner 110 send and receive messages in accordance with one or more network protocols over data links 121 and 122, respectively. Data links 121–123 may comprise any one of a number of well-known types of physical connections, such as IEEE 802.3 Ethernet, 10Base5, or 10BaseT allowable cables. NIDs 115 and 131 allow their associated network nodes to communicate with other NIDs associated with network 120.

Figure 2:
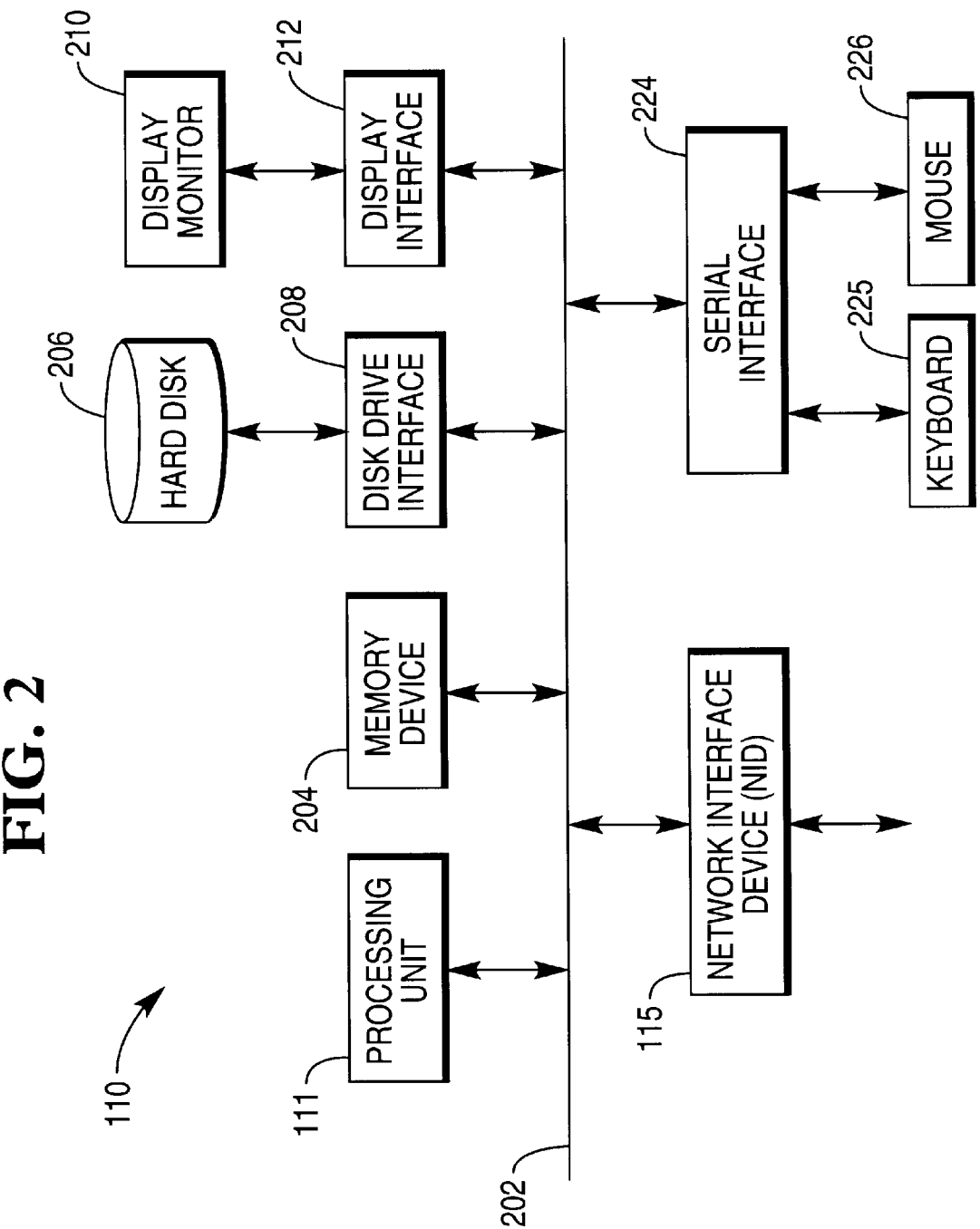
FIG. 2 is a block diagram of a network traffic planner station according to one embodiment of the present invention.

FIG. 2 is a block diagram of network management system (NMS) traffic planner 110 according to one embodiment of the present invention. NMS traffic planner 110 comprises system bus 202, processing unit 111 (shown in FIG. 1), network interface device (NID) 115 (also in FIG. 1), memory device 204, hard disk 206, disk drive interface 208, display monitor 210, display interface 212, serial interface 224, mouse 225, and keyboard 226. System bus 202 provides a communication path among processing unit 111, NID 111, memory device 204, disk drive interface 208, display interface 212 and serial interface 224. In alternate embodiments of the present invention, NMS traffic planner 110 may also include audio input and output devices (not shown), video input devices (not shown), and means to print information and reports.

Memory device 204 stores programs (including instructions and data) that are executed by processing unit 111. Hard disk 206, operating through disk drive interface 208, also stores data and instructions. However, memory device 204, which is typically random access memory (RAM), has faster access speed than hard disk 206, while hard disk 206 has higher capacity than memory device 204. Processing unit 111 accesses memory device 204 and hard disk 206 in order to execute the programs stored therein and control the operation of NMS traffic planner 110. Processing unit 111 also controls the transmission of programs and data between memory device 204 and hard disk 206.

Display monitor 210 is coupled to system bus 202 through display interface 212 and provides a visual interface between the user and programs being executed. Mouse 226 and keyboard 225 are coupled to system bus 202 through serial interface 224 and provide input points to NMS traffic planner 110.

Figure 3:
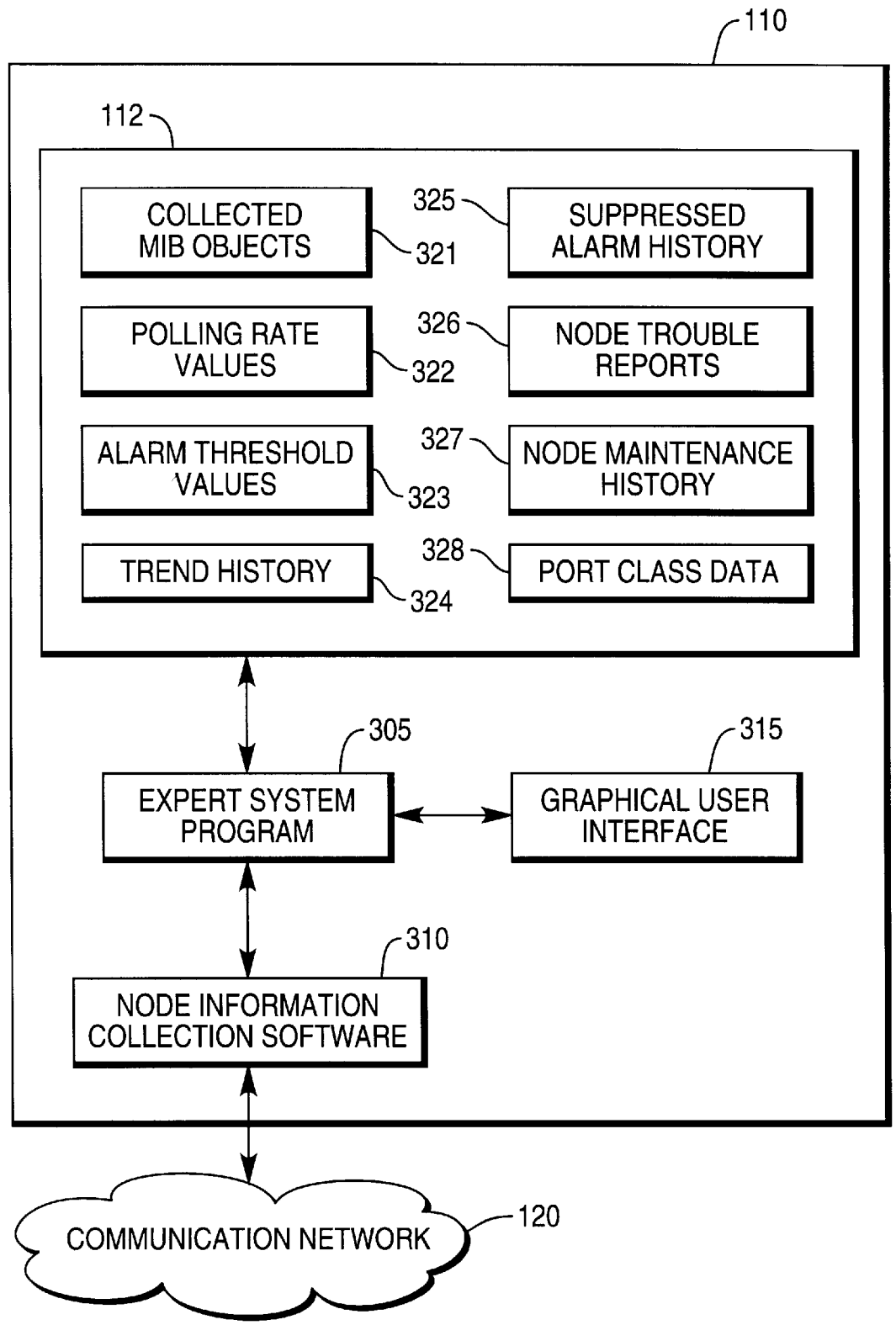
FIG. 3 is a detailed block diagram of a network traffic planner station according to one embodiment of the present invention.

FIG. 3 is a detailed block diagram of NMS traffic planner 110 according to one embodiment of the present invention. NMS traffic planner 110 comprises expert system program 305, which directs the interactions of NMS traffic planner 110 with the remainder of computer network 100. Under the control of expert system program 305, node information collection software 310 retrieves MIB objects from the managed nodes in computer network 100 via the data links in communication network 120. Expert system program 305 also interacts with a system user via graphical user interface 315, which appears on display monitor 210.

Expert system program 305 accesses data traffic information and system rules stored in knowledge database 112. Knowledge database 112 comprises collected MIB objects 321, polling rate values 322, alarm threshold values 323, trend history 324, suppressed alarm history 325, node trouble reports 326, node maintenance history 327 and port class data 328. Expert system program 305 measures, compares and reports on selected trend data and historical fault data stored in knowledge database 112, thereby allowing a system operator to better control and direct maintenance and repairs of computer network 100. Expert system program 305 acts upon MIB object information retrieved from nodes in computer network 100 and upon rules or expectations given by a system operator. Expert system program 305 operates in real time on data traffic with minimal disruptions.

Expert system program 305 reads collected MIB objects 321 and calculates statistics for pertinent parameters, such as "bad packet" frequency rate. In one embodiment of the present invention, collected MIB objects 321 contains information related to data packets that were improperly received at specific nodes in computer network 100. Collected MIB objects 321 identifies the network node on which a bad data packet was received, the particular port on which the bad data packet was received, the time at which a bad data packet was received and the network node which transmitted the bad data packet.

From this data, expert system program 305 calculates average bad packet frequency rates during predefined timing windows and the rate of change of bad packet frequency rates. Expert system program 305 also determines if any trends are occurring in the bad packet frequency rates. In response to a determination that the bad packet frequency rate in a particular node in computer network 100 is increasing, NMS traffic planner 110 can intelligently increase the rate ("polling rate") at which MIB objects are collected from the network node in question by modifying polling rate values 322. This enables NMS traffic planner 110 to more rapidly and more accurately measure the bad packet frequency rate at a particular node.

NMS traffic planner 110 may also reduce the polling rate on communication network 120 during non-critical times to allow greater utilization of the bandwidth of communication network 120 by its users. Also, the workload on NMS traffic planner 110 is reduced by a lower polling rate, allowing a larger network to be monitored. Therefore, setting the polling rate is frequently a function of the actual network constraints in each individual implementation.

Alarm threshold values 323 contains predefined values of bad packet frequency rate at which alarms may be triggered. For example, the rising threshold alarm initially may be set at 10% and the falling threshold alarm initially may be set at 5% by expert system program 305 or by a system operator via graphical user interface 315. Subsequently, the threshold levels may be manually modified by a system operator via graphical user interface 315 or may be automatically modified by expert system program 305.

Advantageously, NMS traffic planner 110 is able to determine if an event causing bad data packets to be received in a network node is of a brief and unimportant duration, such as one minute or less, and may thereby issue an alarm of lesser urgency, or may issue no outward alarm at all. A record of such suppressed alarms is nonetheless stored in suppressed alarm history 325 in order to assist in troubleshooting particular computer nodes and to maintain an historical record of the behavior of a particular portion of the network, or a particular class of ports among the network nodes.

Expert system program 305 compares bad packet frequency rates of numerous network nodes in order to determine if different parts of the network are simultaneously experiencing a similar and sudden rise in bad data packets. In such a case, expert system program 305 issues a second type of alarm of greater urgency that warns the system operator that a high bad packet frequency rate is seen on more than one network node and that the bad data packets are occurring in a simultaneous or correlated manner.

Node trouble reports 326 contain data retrieved from network nodes related to data traffic conditions at the time an error or fault occurred. For example, node trouble reports 326 may contain an entry that a particular node was attempting to transmit at a time when a high bad packet frequency rate occurred, or that an Uninterruptable Power Supply attached to a particular network node reported an incoming AC power line disturbance typical of a lightning storm during an interval in which bad data packets were received.

Similarly, node maintenance history 327 contains scheduling information regarding repairs and routine maintenance being performed on communication network 120 and on individual network nodes in computer network 100. This history is brought to the attention of the system operator of NMS traffic planner 110 to thereby inform the system operator that any errors occurring during the system maintenance may be caused by maintenance activities, and not by faulty equipment.

Trend history 324 contains histories of data traffic error trends and the eventual outcomes of those trends. The trend history data is displayed by expert system program 305 to the system operator as part of an alarm message.

NMS traffic planner 110 also compares similar ports on the same hub or on any other network device. NMS traffic planner 110 also compares similar or corresponding ports of the same class on other hubs that may be operating under similar data traffic load conditions. The present invention recognizes that ports that are similar in electrical and software functionality should also be similar in performance. Similar ports under the same data traffic loads should generate similar data throughput, standard network statistics and error rates, buffer fill levels, delay times and the like. Expert system program 305 assigns greater weight to trend data when similar data traffic passes through similar ports in a group. Data associated with similar ports is stored-in port class data 328.

In a preferred embodiment, expert program 305 may generate artificial traffic under carefully controlled conditions in order to probe for weaknesses in computer network 100. The artificial traffic may be generated by NMS traffic planner 110 or may be generated at other points in computer network 100 under the control of NMS traffic planner 110.

Furthermore, expert system program 305 may isolate portions of computer network 100 in order to force traffic data to seek an alternate route in order to test built-in network redundancy.

In a preferred embodiment, expert system program 305 may receive system rules from a system operator via graphical user interface 315. A typical system rule describes data traffic constraints in the network. For example, the system operator may specify that Node X must always be able to communicate with Node Y at a specific number of data packets per minute. NMS traffic planner 110 then examines its knowledge database 112, examines the historical and theoretical capacities of computer network 100, and reports whether the data traffic constraint specified by the system operator is historically and theoretically possible. NMS traffic planner 110 may additionally generate a list of network links and routing nodes required to meet the rule specified by the system operator and describe the data traffic histories of the specified network links and routing nodes. Additionally, expert system program 305 may identify specific links in routing nodes that are inadequate.

Although the present invention has been described in detail, those skilled in the art should understand that they can make various changes, substitutions and alterations herein without departing from the spirit and scope of the invention in its broadest form.

What is claimed is:

1. For use in a computer network having a plurality of nodes associated therewith, a data traffic management system for managing data traffic among said plurality of nodes, comprising:

a polling circuit that retrieves node traffic information from said plurality of nodes; and process logic that compares first selected node traffic information associated with a first selected one of said plurality of nodes with a first threshold level to detect a trend in said first selected node traffic information with respect to said first threshold level wherein said process logic, in response to a detection of said trend, modifies a polling rate at which said polling circuit retrieves said first selected node traffic information.

2. The data traffic management system as recited in claim 1 wherein said modification is an increase in said polling rate in response to a trend indicating that an error rate of said data traffic is increasing toward said first threshold level.

3. The data traffic management system as recited in claim 1 wherein said modification is a decrease in said polling rate in response to a trend indicating that an error rate of said data traffic is decreasing away from said first threshold level.

4. The data traffic management system as recited in claim 1 wherein said process logic, in response to a determination that said first selected node traffic information has exceeded said first threshold level for only an insignificant period of time, suppresses an alarm indicating that node traffic information has exceeded said first threshold level.

5. The data traffic management system as recited in claim 4 wherein said process logic compares a number of suppressed alarms occurring during a predetermined time interval to a suppressed alarm threshold rate and, in response to a determination that said number of suppressed alarms exceeds said suppressed alarm threshold rate, triggers an alarm indicating that said suppressed alarm threshold rate has been exceeded.

6. The data traffic management system as recited in claim 1 wherein said process logic compares second selected node traffic information associated with a second selected one of said plurality of nodes with a second threshold level to detect a trend in said second selected node traffic information with respect to said second threshold level.

7. The data traffic management system as recited in claim 6 wherein said process logic triggers an urgent alarm in response to a determination that first selected node traffic information and said second selected node traffic information are simultaneously exceeding said first and second threshold levels, respectively.

8. The data traffic management system as recited in claim 1 wherein said process logic alerts a system operator to maintenance activities in said computer network that coincide with faults detected by said process logic.

9. The data traffic management system as recited in claim 1 wherein said process logic alerts a system operator to external disturbances occurring at one of said plurality of nodes that coincide with faults detected by said process logic.

10. The data traffic management system as recited in claim 1 wherein said process logic generates data traffic to test a data traffic capacity of a selected one of said plurality of nodes.

11. The data traffic management system as recited in claim 1 wherein said process logic associates an eventual outcome with said trend, wherein said eventual outcome causes said process logic to alert a system operator to take corrective action.

12. The data traffic management system as recited in claim 1, wherein said node traffic information includes MIB objects.

13. The data traffic management system as recited in claim 12, wherein said MIB objects include statistical information including a number of bad packets received at a particular node.

14. The data traffic management system as recited in claim 1, wherein said process logic is implemented in expert system software.

15. The data traffic management system as recited in claim 1, wherein said trend is an average bad packet frequency rate during a pre-defined timing window and a rate of change for each node.

16. For use in a computer network having a plurality of nodes associated therewith, a method of managing data traffic among said plurality of nodes, comprising the steps of:

retrieving node traffic information from said plurality of nodes; and comparing first selected node traffic information associated with a first selected one of said plurality of nodes with a first threshold level to detect a trend in said first selected node traffic information with respect to said first threshold level modifying a polling rate at which said polling circuit retrieves said first selected node traffic information in response to a detection of said trend.

17. The method as recited in claim 16 wherein said modifying step includes increasing said polling rate in response to a trend indicating that an error rate of said data traffic is increasing toward said first threshold level.

18. The method as recited in claim 16 wherein said modifying step includes decreasing said polling rate in response to a trend indicating that an error rate of said data traffic is decreasing away from said first threshold level.

19. The method as recited in claim 16 including the further step of suppressing an alarm indicating that node traffic information has exceeded said first threshold level in response to a determination that said first selected node traffic information has exceeded said first threshold level for only an insignificant period of time.

20. The method as recited in claim 19 including the further step of comparing a number of suppressed alarms occurring during a predetermined time interval to a suppressed alarm threshold rate and, in response to a determination that said number of suppressed alarms exceeds said suppressed alarm threshold rate, triggering an alarm indicating that said suppressed alarm threshold rate has been exceeded.

21. The method as recited in claim 16 including the further step of comparing second selected node traffic information associated with a second selected one of said plurality of nodes with a second threshold level to detect a trend in said second selected node traffic information with respect to said second threshold level.

22. The method as recited in claim 21 including the further step of triggering an urgent alarm in response to a determination that first selected node traffic information and said second selected node traffic information are simultaneously exceeding said first and second threshold levels, respectively.

23. The method as recited in claim 16 including the further step of alerting a system operator to maintenance activities in said computer network that coincide with detection of said trend.

24. The method as recited in claim 16 including the further step of alerting a system operator to external disturbances occurring at one of said plurality of nodes that coincide with detection of said trend.

25. The method as recited in claim 16 including the further step of generating data traffic to test a data traffic capacity of a selected one of said plurality of nodes.

26. The method as recited in claim 16 including the further step of causing selected network nodes to block data traffic on a selected communication path between a first selected network node and a second selected network node to thereby cause data traffic to be redirected to an alternate communication path between said first selected network node and said second selected network node.

27. The method as recited in claim 16 including the further step of associating an eventual outcome with said trend, wherein said eventual outcome causes an alert to be communicated to a system operator so that said system operator may take corrective action.

28. The method as recited in claim 16, wherein said node traffic information includes MIB objects.

29. The method as recited in claim 28, wherein said MIB objects include statistical information including a number of bad packets received at a particular node.

30. The method as recited in claim 16, wherein said process logic is implemented in expert system software.

31. The method as recited in claim 16, wherein said trend is an average bad packet frequency rate during a pre-defined timing window and a rate of change for each node.

* * * * *